Patented Sept. 11, 1951

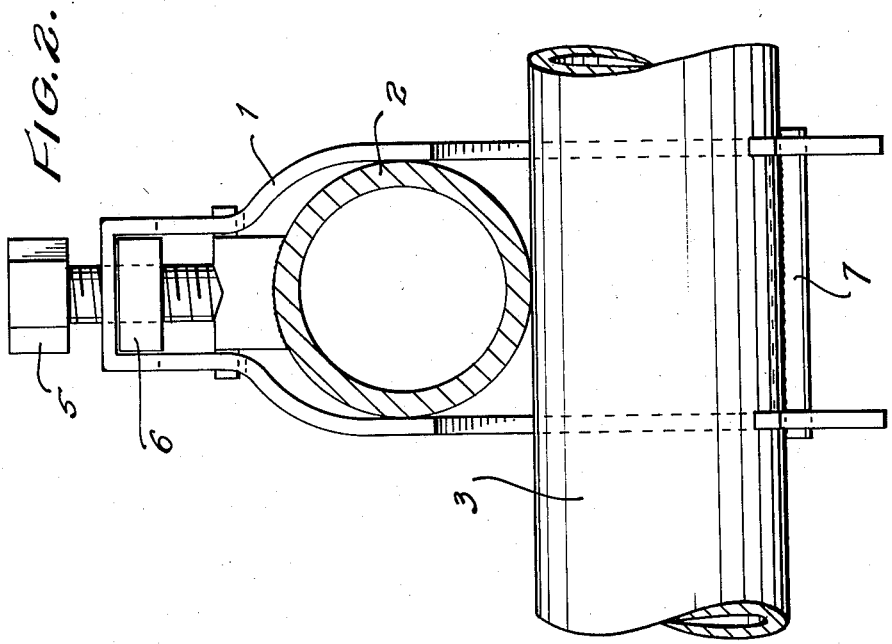
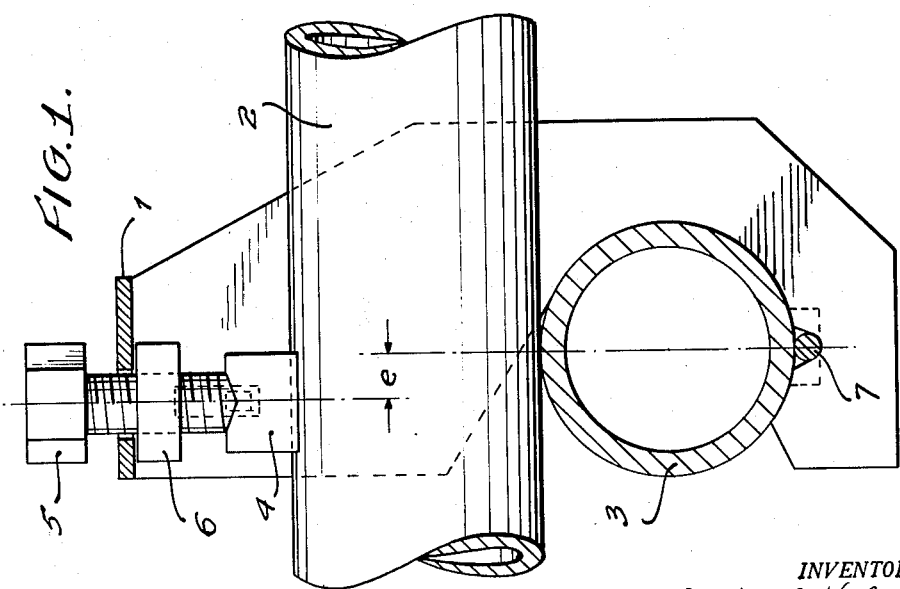

2,567,659

UNITED STATES PATENT OFFICE 2,567,659

COUPLER FOR JOINING OF TWO TUBES OR STRUCTURAL ELEMENTS OF CIRCULAR OR OTHER CROSS SECTION

Oldřich Valenta, Prague, Czechoslovakia

Application February 21, 1948, Serial No. 10,004
In Czechoslovakia May 2, 1946

Section 1, Public Law 690, August 8, 1946
Patent expires May 2, 1966

1 Claim. (Cl. 287—54)

My present invention relates to a means for connecting tubes of a metal scaffolding. This means takes the form of a coupling element which rigidly connects together tubes which extend at right angles to each other at the point where they intersect.

One of the objects of my present invention is to provide a coupling element for such tubes which is of a very simple, inexpensive construction.

A further object of my present invention is to provide a coupling means in which the clamping member has only axial forces applied thereto.

With the above objects in view, my present invention mainly consists of a clamp for clamping together two structural members disposed substantially at right angles to each other, comprising, in combination, a support member having a pair of legs connected at one of the ends thereof by a substantially flat portion of said support member extending at right angles to said legs, said legs being spaced further apart from each other at portions thereof spaced from said flat portion than at the portions thereof immediately adjacent to said flat portion so as to accommodate one of the clamped members therebetween, and said legs having recesses formed therein and extending inwardly from the same respective edges of said legs, said recesses being located in a portion of said legs which is distant from said flat portion thereof so as to form hook members for supporting the other of the clamped members, and said portions of said legs located immediately adjacent to said flat portion being formed with elongated, oppositely located slots passing therethrough and extending in a direction substantially perpendicular to said flat portion of said support member, and said flat portion of said support member being formed with a recess extending therethrough; a clamping bolt extending through said recess in said flat portion in a direction perpendicular to said flat portion and having a head located on the side of said flat portion which is distant from said legs of said support member; a stop nut mounted on said bolt and located on the side of said flat portion which is distant from said head of said bolt; an elongated insert member arranged parallel to said flat portion and perpendicularly to said bolt, said insert member being located at the end of said bolt distant from said head thereof and having a surface formed with a recess therein so as to matingly engage with said last-mentioned end of said bolt, said insert having another surface opposite to said last-mentioned surface and formed with a recess which is adapted to matingly engage with said one of the clamped members; a pair of projections formed on two opposite additional surfaces of said insert and extending through said elongated slots in said portions of said support member which are immediately adjacent to said flat portion, whereby said bolt is stressed only along its axis due to the clamping thereof and whereby any lateral stresses on said bolt are effectively prevented; and an additional insert located in a recess formed in said hook members for frictionally engaging the other of said clamped members.

The novel features which are considered as characteristic for the invention are set forth in particular in the appended claim. The invention itself, however, both as to its construction and its method of operation, together with additional objects and advantages thereof, will be best understood from the following description of specific embodiments when read in connection with the accompanying drawings, in which:

Fig. 1 is an elevational view, partly in section, of a pair of tubular members clamped together by the clamp of my present invention; and Fig. 2 is an elevational view of the clamp of my present invention as viewed from the left-hand side of Fig. 1.

As is evident from the drawing, the clamp of my present invention is intended to connect together a pair of structural members 2 and 3 which are arranged at right angles to each other at the point where these members intersect each other.

The clamp of my present invention comprises a support member 1 having a pair of legs which are joined at the top by a flat portion of the support member which is located substantially at right angles to the legs. As is apparent from Fig. 2, the upper portion of the legs of the support member 1 are located nearer to each other than the lower portions of the legs which are formed with recesses extending inwardly from same respective edges thereof so as to receive the lower tubular structural member 3 therein.

As is evident from Fig. 1, these recesses cause the lower portions of the legs of the support 1 to have a general hook-like shape. The portions of the legs of the support 1 which are spaced further apart than the portions adjacent to the top flat part of support 1 are separated from each other by a distance which is great enough to accommodate the upper tubular structural member 2.

The upper portions of the legs of the support 1 have slots formed respectively therein, which are located opposite to each other and extend in a direction which is substantially perpendicular to the flat top part of support 1. These slots are shown in dotted lines in Figs. 1 and 2. Also, the flat top part of support 1 has an opening passing therethrough substantially centrally thereof, for a purpose to be described below.

Located between the legs of support 1 and above the structural member 2 is an insert 4 which has a lower curved recess adapted to matingly engage with the outer surface of structural member 2, as is clearly evident from Fig. 2. This insert 4 is provided with projections on opposite sides thereof, and these projections are located in the above-mentioned slots so as to guide the insert 4 for movement toward and away from the flat top portion of the support 1.

The insert 4 is also provided with a recess on its upper surface which is adapted to matingly engage with the lower end of the bolt 5 which extends through the opening in the flat top part of support 1, with the head of the bolt being located above this flat top part of the support 1.

Located just beneath the flat top part of the support 1 and on the other side thereof from the head of the bolt 5 is a stop nut 6 which threadedly engages the bolt 5.

The lower parts of the respective legs of the support 1 have cut-out portions formed therein so as to support the ends of an additional insert 7 which frictionally engages the lower part of the structural member 3. The insert 7 may be roughened at that portion thereof which contacts the structural member 3.

The above described clamp may be used after the tubes 2 and 3 are properly arranged with respect to each other by removing the inserts 4 and 7 and slipping the support 1 over the tubes somewhat as shown in the drawings. Then the elements 4 and 7 may be inserted and the bolt 5 turned through the stop nut 6 so as to clamp members 2 and 3 together and press them against inserts 4 and 7, respectively. The sides of the nut 6 may be so arranged that they engage the inner sides of the legs of the support 1 so as to prevent the turning of the nut 6.

It is to be understood that the structure described above may be used without the inserts 4 and 7, and in this case the lower end of bolt 5 would simply bear against the upper surface of structural member 2.

It will be noted that due to the use of insert 4 which can only move vertically in the above-mentioned slots which are located along a plane including the axis of the bolt 5, only axial stresses will be applied to the bolt 5 and there will be no lateral stresses tending to tilt the longitudinal axis of the bolt 5, even though the axis of the lower structural member 3 is displaced from the axis of bolt 5, such as for example by the distance e shown in Fig. 1. This result is further enhanced by the fact that the stop nut 6 has an upper flat side which is arranged in substantially perpendicular relation to the axis of the bolt 5 and which engages the lower surface of the flat top part of support 1 which is also arranged in perpendicular relation to the axis of the bolt 5.

It will be understood that each of the elements described above, or two or more together, may also find a useful application in other types of coupling means differing from the types described above.

While I have illustrated and described the invention as embodied in coupler for joining two tubes or structural elements of circular or other cross section, I do not intend to be limited to the details shown, since various modifications and structural changes may be made without departing in any way from the spirit of my invention.

Without further analysis, the foregoing will so fully reveal the gist of my invention that others can, by applying current knowledge, readily adapt it for various applications without omitting features that, from the standpoint of prior art, fairly constitute essential characteristics of the generic or specific aspects of this invention and, therefore, such adaptations should and are intended to be comprehended within the meaning and range of equivalence of the following claim.

What I claim as new and desire to secure by Letters Patent is:

A clamp for clamping together two structural members disposed substantially at right angles to each other, comprising, in combination, a support member having a pair of legs connected at one of the ends thereof by a substantially flat portion of said support member extending at right angles to said legs, said legs being spaced further apart from each other at portions thereof spaced from said flat portion than at the portions thereof immediately adjacent to said flat portion so as to accommodate one of the clamped members therebetween, and said legs having recesses formed therein and extending inwardly from the same respective edges of said legs, said recesses being located in a portion of said legs which is distant from said flat portion thereof so as to form hook members for supporting the other of the clamped members, and said portions of said legs located immediately adjacent to said flat portion being formed with elongated, oppositely located slots passing therethrough and extending in a direction substantially perpendicular to said flat portion of said support member, and said flat portion of said support member being formed with a recess extending therethrough; a clamping bolt extending through said recess in said flat portion in a direction perpendicular to said flat portion and having a head located on the side of said flat portion which is distant from said legs of said support member; a stop nut mounted on said bolt and located on the side of said flat portion which is distant from said head of said bolt; an elongated insert member arranged parallel to said flat portion and perpendicularly to said bolt, said insert member being located at the end of said bolt distant from said head thereof and having a surface formed with a recess therein so as to matingly engage with said last-mentioned end of said bolt, said insert having another surface opposite to said last-mentioned surface and formed with a recess which is adapted to matingly engage with said one of the clamped members; a pair of projections formed on two opposite additional surfaces of said insert and extending through said elongated slots in said portions of said support member which are immediately adjacent to said flat portion, whereby said bolt is stressed only along its axis due to the clamping thereof and whereby any lateral stresses on said bolt are effectively prevented; and an additional insert located in a recess formed in said hook members for frictionally engaging the other of said clamped members.

OLDŘICH VALENTA.

REFERENCES CITED

The following references are of record in the file of this patent:

UNITED STATES PATENTS

| Number | Name | Date |
|---|---|---|
| 462,319 | Loehner et al. | Nov. 3, 1891 |
| 1,434,352 | Jester | Oct. 31, 1922 |
| 1,437,088 | Brandt | Nov. 28, 1922 |
| 1,716,904 | Siderits | June 11, 1929 |
| 1,941,418 | Rich | Dec. 26, 1933 |
| 2,044,700 | Jones | June 16, 1936 |
| 2,057,329 | Duff | Oct. 13, 1936 |
| 2,156,208 | Thornton | Apr. 25, 1939 |
| 2,187,642 | Brown | Jan. 16, 1940 |
| 2,233,458 | Segre | Mar. 4, 1941 |
| 2,476,863 | Hawes | July 19, 1949 |

FOREIGN PATENTS

| Number | Country | Date |
|---|---|---|
| 77,048 | Czechoslovakia | Nov. 15, 1947 |
| 591,359 | Great Britain | of 1947 |